May 16, 1961 G. H. BARRY 2,984,701

PHASE LOCK SYNCHRONIZER FOR CONTROLLED-SHIFT DATA COMMUNICATION SYSTEM

Filed Feb. 18, 1960 5 Sheets-Sheet 1

INVENTOR.
GEORGE H. BARRY
BY Moody and Goldman
ATTORNEYS

INVENTOR.
GEORGE H. BARRY
BY Moody and Goldman
ATTORNEYS

INVENTOR.
GEORGE H. BARRY
BY Moody and Goldman
ATTORNEYS

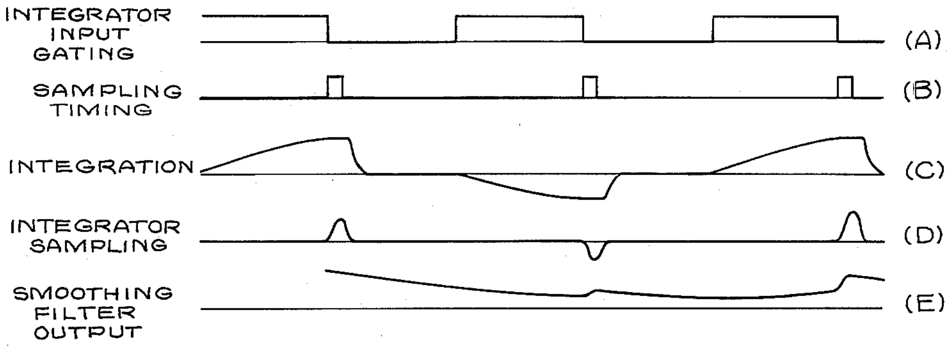
FIG— 5
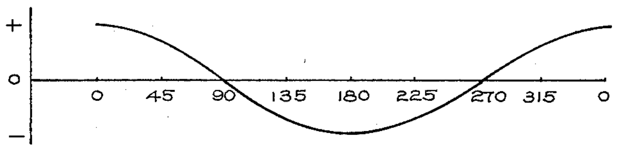
$$\text{AVERAGE AMPLITUDE} = K\int_0^{n\pi}\left[\sin\omega_o t \ \ \sin(\omega_o t + \omega_m t)\right]$$
FIG— 6
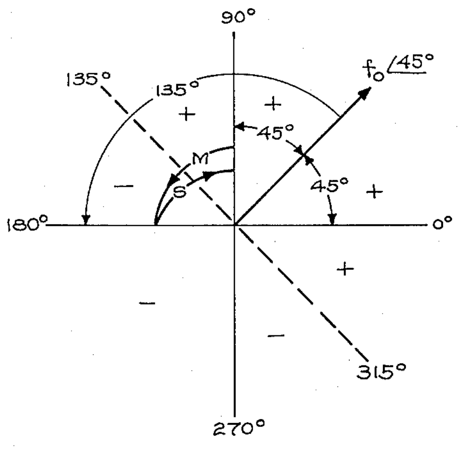
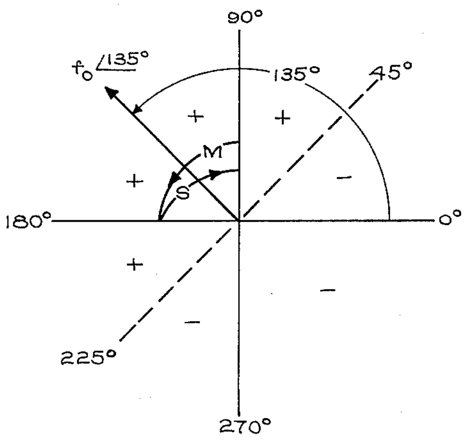
FIG— 7(A) FIG— 7(B)
INVENTOR.
GEORGE H. BARRY
BY Moody and Goldman
ATTORNEYS INVENTOR.
GEORGE H. BARRY
BY Mooney and Goldman
ATTORNEYS 2,984,701

PHASE LOCK SYNCHRONIZER FOR CONTROLLED-SHIFT DATA COMMUNICATION SYSTEM

George H. Barry, North Hollywood, Calif., assignor to Collins Radio Company, Cedar Rapids, Iowa, a corporation of Iowa Filed Feb. 18, 1960, Ser. No. 9,536

11 Claims. (Cl. 178—66)

This invention relates to an automatic phase-control circuit. It is useful with a minimum frequency-shift data communication system.

In a minimum frequency-shift system, two frequencies are sequentially generated, wherein each varies by 90° of phase per data bit relative to a center frequency. Thus, mark (M) data bit is obtained by a 90° phase shift in one direction at a constant rate relative to a center frequency; and a space (S) data bit is obtained by a constant 90° phase shift in the opposite direction relative to the center frequency. A system for generating and detecting information modulated in the above-described manner is described and claimed in Patent application Serial No. 755,740, filed August 18, 1958, titled, "Minimum-Shift Data Communication System" by Melvin L. Doelz and Earl T. Heald, and assigned to the same assignee as the present invention.

In order to detect the above-described type of frequency-shift modulation, a local frequency must be generated that is phase-locked with the center frequency of the receiver signal. The center-frequency inherent in the modulated signal cannot properly be determined by filtering due to the very close proximity percentagewise between it and the shifted frequencies. Rather, the invention uses the unique phase-reversal conditions found in the minimum-shift signal to derive phase-lock for a locally-generated frequency.

With a signal modulated in the above described manner, there are only four phase positions at which a phase reversal can occur. These phase reversals occur when there is a shift from one frequency to the other. Each frequency-shift involves changing from one direction of phase rotation to the opposite direction relative to the center frequency. The phase reversals occur at 0°, 90°, 180° or 270° relative to the phase of its center frequency.

The invention uses a locally-derived standard frequency which is phase stable over a long period of time with respect to the center frequency of a received minimum-shift. At v.l.f. (very low frequencies), this can be done with an oscillator having a stability of one part in $10^7$ per day, which is easily obtainable in the present state of the art. However, the output of such an oscillator lacks the proper phase needed for demodulation of the received signal. Hence, it is the primary object of this invention to interpose a phase shift for the output of a locally-generated frequency to provide a required phase for demodulation of a minimum-shift signal.

The invention includes a triple multiplication system which, when properly averaged, can yield a signal that varies in magnitude as a function of the phase relationship between the center frequency of the received signal and a locally-generated frequency. The triple multiplication is averaged periodically over periods of two bit lengths each; and the magnitude of each integration is sampled to provide a signal which varies in magnitude with phase drift.

The triple product system involves separating the locally-generated frequency into two parts which are phased 90° relative to each other. The input signal is separately multiplied by each of the parts to provide separate products. A third multiplication multiplies the separate products by each other. The third multiplication is integrated periodically, with a period being preferably equal to two bit lengths of the received signal. Furthermore, such integration periods need not be synchronized with the bit periods of the received signal. At the end of each integration, the magnitude of the integrated signal is sampled. The locally-generated frequency is variably phase-shifted until the sampled magnitude has a predetermined value. The adjustment may be done manually or automatically by servomechanism.

Further objects, features and advantages of this invention will become apparent to those skilled in the art upon further study of this specification and the accompanying drawings, in which.

Figures 4(A)–(H) show waveforms illustrating a first-order multiplication used in the invention;

Figures 5(A)–(E) show waveforms found in the invention.

Figure 4:
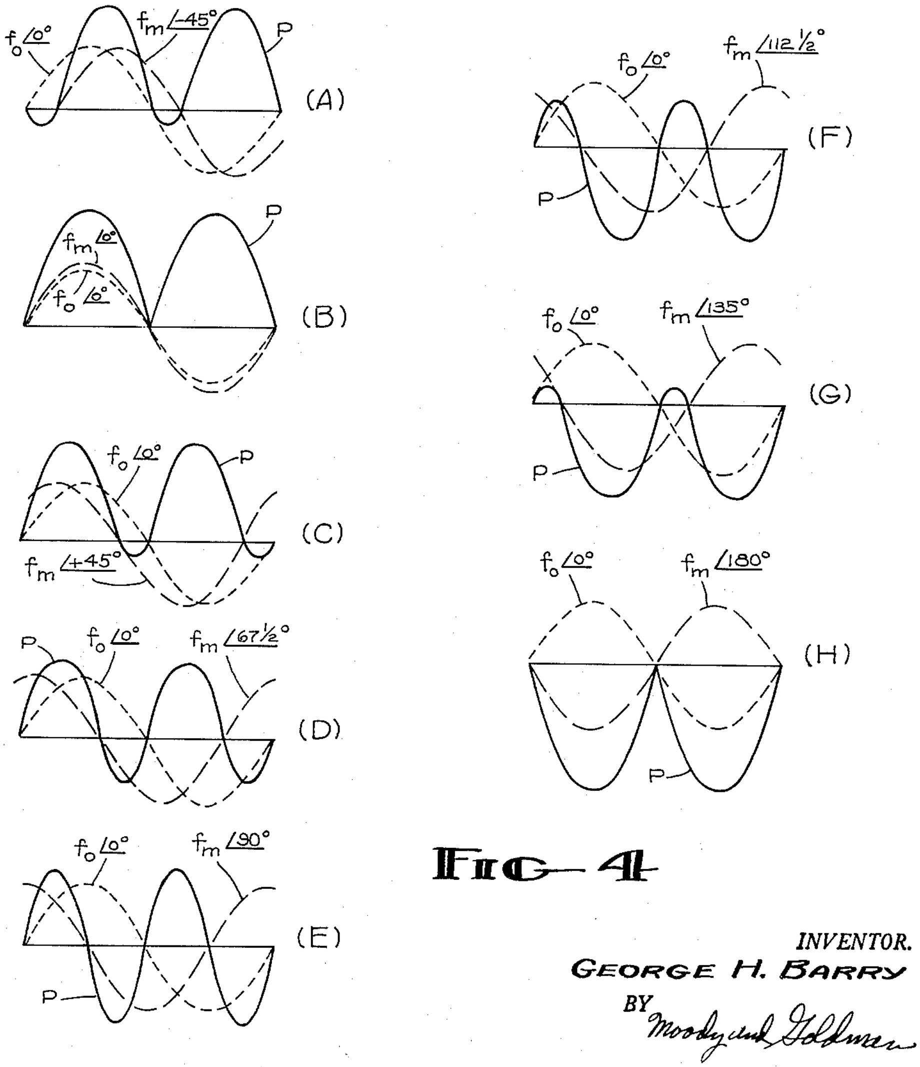

Figure 6 is a diagram giving average relationships for waveforms of the type of Figure 4;

(Figures 7(A) and (B) show phase relationships between local frequency components and the phase reversal positions of a received signal.

Figure 8A:
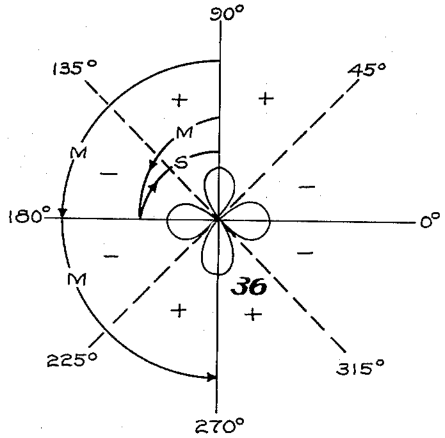

Figures 8(A) and (B) and 10(A) and (B) provide diagrams of the second order product operation.

Figure 9:
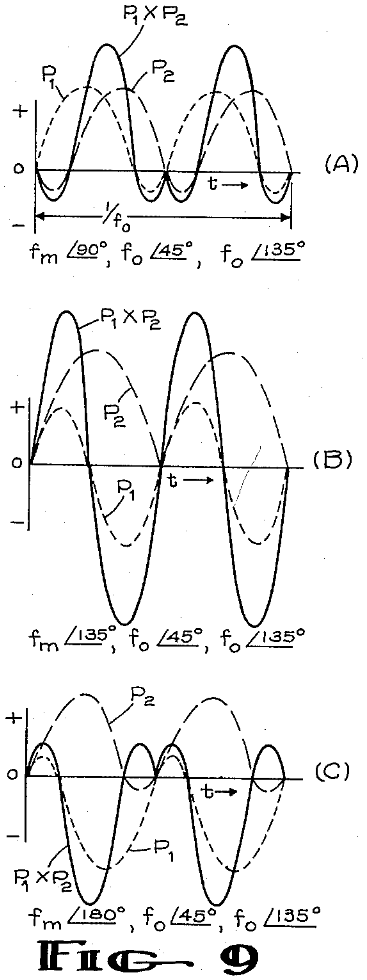

Figures 9(A), (B) and (C) are waveforms illustrating the second order multiplication used in the invention;

As mentioned above, the modulation process with which the invention is concerned involves shifting between two frequencies. A frequency midway between the shift frequencies is defined as the "center frequency." It is represented by a vector $f_0$ in Figure 3, which is stationary therein; and therefore the entire diagram must be considered as rotating at a rate of $2\pi f_0$. The modulation is represented by a vector $f_m$, which rotates at a constant velocity relative to vector $f_0$ and can reverse its direction of rotation at any of the four phase positions 0°, 90°, 180° or 270°. A mark (M) information bit is provided when vector $f_m$ rotates counterclockwise between any adjacent two of the four phase positions. In a like manner, a space (S) information bit is represented by vector $f_m$ rotating clockwise in Figure 3, between any two of the four phase positions. Hence, at the beginning and at the end of either type of information bit, vector $f_m$ is at one of the four phase positions.

Accordingly, whenever the modulation changes from M to S, or S to M, vector $f_m$ reverses its direction of rotation at one of the four respective phase positions. On the other hand, if any information bit is to be repeated, vector $f_m$ continues to rotate in the same direction through as many 90° periods as there are repetitions.

During any single bit period, both the center frequency $f_0$ and the modulation frequency $f_m$ can go through a very large number of cycles depending on the value of $f_0$. Hence, the modulation vector will either gain or lose 90° with respect to the center frequency $f_0$ during any modulation bit period.

The percentage of the difference between $f_m$ and $f_0$ related to $f_0$ is generally very small; and therefore, it is virtually impossible to obtain by filtering any center frequency that may exist. Accordingly, the invention does not utilize such filtering operation.

Figure 1:
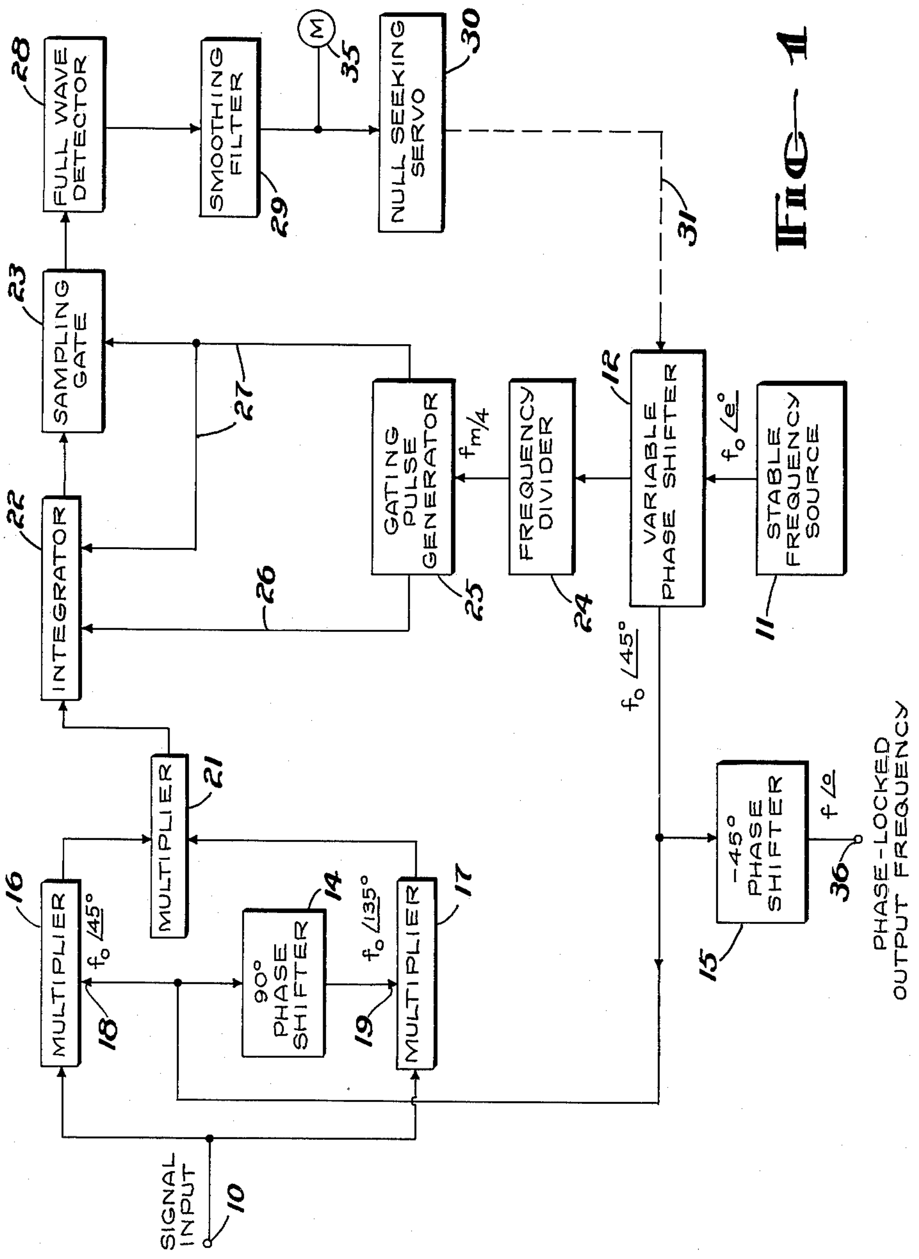
Figure 1 illustrates one embodiment of the invention.

In the embodiment of Figure 1, the modulated signal is provided at terminal 10. Furthermore, a stable frequency source 11 is provided; and it may be an ovenstabilized crystal oscillator that has an output frequency which is the same as the center frequency of the modulated signal received at terminal 10. The center frequency of the received signal is sufficiently stable so that it cannot drift very fast with respect to the phase of source 11.

Nevertheless, the phase of the frequency from source 11 ordinarily will contain an error-angle ($e°$), which must be corrected before the output of source 11 may be used to detect the received signal. A variable phase shifter 12 is connected to the output of source 11 to phase shift it by an angle ($45°-e°$). This provides a frequency with a known phase of 45° relative to one of the four phase-reversal positions of the received signal.

Variable phase shifter 12 is automatically controlled by a servo system 30 to correct the phase-angle error in a manner that is explained below. Phase shifter 12 is preferably of the electromechanical variety, which can be set at a given phase position with the assurance that it will thereafter remain at that position until reset. In other words, phase shifter 12 can store its setting.

A phase shifter 14 receives part of the output of phase shifter 12 and shifts it by 90°. Hence, the output of phase shifter 12 is split into two components separated by 90°, and they have phases of 45° and 135° respectively which can be vectorially represented as $$f_0\underline{|45°}\text{ and }f_0\underline{|135°}$$

relative to a received center frequency assumed to be at 0°.

A pair of multipliers 16 and 17 respectively receive the phase shifted components at respective inputs 18 and 19. Furthermore, multipliers 16 and 17 each have another input connected to terminal 10 to receive the modulated signal.

Each multiplier provides an output that is the product of its two inputs. Thus, multiplier 16 provides an output which is an instantaneous multiplication of the signal by $$f_0\underline{|45°}$$

while multiplier 17 provides an output which is an instantaneous product of the signal by $$f_0\underline{|135°}$$

For example, each multiplier may be a phase detector or a balanced modulator of conventional type without a low-pass filter at its output.

Another multiplier 21 receives the outputs of multipliers 16 and 17 and multiplies them together to provide its output. Hence, multiplier 21 provides a second-order multiplication.

An integrator 22 receives the output of signal multiplier 21 and periodically integrates it for periods that are each equal to two bit lengths of the signal received at terminal 10. Integrator 22 may be a capacitor charged by the output of multiplier 21 for two bit length periods. After each integration period, the integrator is sampled and quenched, such as by short-circuiting its plates through a gated diode.

A sampling gate 23 is connected to integrator 22 and samples the amplitude of the integrator signal at or after the end of each integration period. The sampling is done preferably at the time that integrator 22 is quenched, since these operations can be combined. The output of each sampling gate is pulses of short duration with varying polarity; but this invention only uses their amplitude without regard to polarity. Pulse polarity is a function of the modulated data. A full wave detector 28 is provided at the output of gate 23 to obtain the same polarity for all pulses. The amplitude of these pulses is zero when variable phase shifter 12 is adjusted to provide output frequency $$f_0\underline{|45°}$$

A smoothing filter 29 is connected to the output of rectifier 28 in order to remove the pulsing effect of the signal and maintain an output which varies smoothly as a function of the magnitude of the pulses.

A meter 35, which may be a voltmeter or ammeter, is connected to the output of filter 29. Variable phase shifter 12 may be manually adjusted until meter 32 indicates 0 voltage or current. Then phase shifter 12 provides a required output of $$f_0\underline{|45°}$$

However, as illustrated in Figure 1, the adjustment of phase shifter 12 is done automatically by a null-seeking servo 30 of conventional type. Its input is connected to the output of filter 29, and the servo output shaft 31 is connected to phase shifter 12 to adjust it. Servo 30 moves its output shaft until it receives a null input.

The timing for integrator 22 and sampling gate 23 is derived from an output of phase shifter 12, although it could as well be derived from an output of frequency source 11. The phase error of source 11 will have no effect upon the accuracy of the gating function. Accordingly, a frequency divider 24 divides the frequency of source 11 to provide a frequency $$\frac{f_m}{4}$$

where $f_m$ is the bit rate of the modulated signal. A gating pulse generator 25 is connected to the output of divider 24 and generates a pair of pulsed signals provided on leads 26 and 27 that connect to integrator 22 and gate 23. The wave-form on lead 26 is illustrated in Figure 5(A), and it is merely a square-wave formed from frequency $$\frac{f_m}{4}$$

by conventional means. Integrator 22 is enabled to receive an input signal during each positive cycle of the wave in Figure 5(A). Figure 5(C) illustrates the integration operation.

A sampling and quenching wave on lead 27 is shown in Figure 5(B), and its wave consists of pulses which immediately follow the trailing edge of the positive-going cycles of the square wave in Figure 5(A). They may be derived by a differentiation circuit or by a one-shot multivibrator (not shown) triggered by the trailing edge of the positive-going pulses in Figure 5(A). At the same time that the integrator is being sampled, it is also being quenched or discharged. Accordingly, lead 27 is also connected to integrator 22 to provide quenching. A transformer (not shown) having a primary in the quenching path can provide an output proportional to the integrated amplitude. Figure 5(D) illustrates the output of sampling gate 23; and Figure 5(E) shows the output of smoothing filter 29, wherein its amplitude varies with the magnitude of the rectified pulses.

Figure 3:
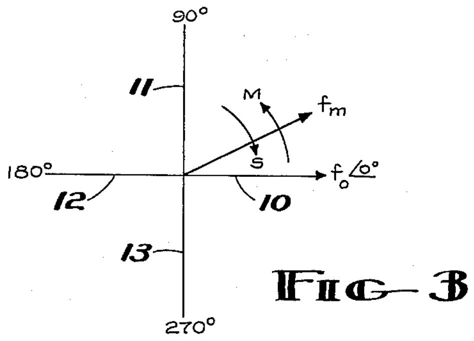
Figure 3 illustrates vectorially the form of the received modulation.

The multiplication operation of each of multipliers 16 and 17 may be better understood by considering Figures 4(A)–(H). It will be recalled that vector $f_m$ in Figure 3 is moving away from (or toward) the $f_0$ vector position at a rate which is slow compared to the rate that both are rotating. Thus, over a given cycle of $f_0$, the phase between $f_0$ and $f_m$ will change only very slightly, and the change over a cycle is neglected for present purposes. Thus, if the vectors start off together in phase, then a cycle will appear as shown in Figure 4(B), wherein they are superimposed on each other as waves $$f_0\underline{|0°}\text{ and }f_m\underline{|0°}$$

Their product is shown by wave P which always has a positive sign in Figure 4(B). The other Figures 4 illustrate what happens to the product between the two waves when they drift apart in phase angle. Thus, in Figure 4(C), $f_m$ has drifted to an angle of 45° leading with respect to $f_0$; and it is seen that the product wave P now has a small negative portion in each one-half cycle, but has a much larger positive portion. Figure 4(A) shows $f_m$ lagging by 45° and the resultant product, which has small negative portions of the same amount as in Figure 4(C) although differently positioned. Figures 4(D), (E), (F), (G) and (H) each show the effects upon the product wave P as $f_m$ leads $f_0$ by angles 67½°, 90°, 112½°, 135°, and 180° respectively. Thus, when waves $f_0$ and $f_m$ have drifted apart by 90°, it is seen in Figure 4(E) that the product wave P becomes symmetrical about the alternating axis and is a sine wave at twice the frequency of $f_0$. A symmetrical condition like that of Figure 4(E) is also obtained when the waves are 270° apart. Accordingly, the average product over a cycle becomes zero when $f_0$ and $f_m$ have moved to precisely 90° or 270° apart. When less than ±90° apart, the average product is positive; and when more than ±90° apart, the average product is negative. The average product is entirely negative when the waves are 180° apart. Figure 6 shows the variation in the average product of $f_0$ and $f_m$ as $f_m$ varies. In Figure 6, $\omega_0$ is $2\pi f_0$ and $\omega_m$ is $2\pi f_m$. However, the embodiment of Figure 1 uses instantaneous products of the type in Figure 4, and does not use the average products given in Figure 6, which is useful only in that it gives some indication of how the instantaneous product varies.

Multiplier 21 receives the instantaneous product waves provided from both multipliers 16 and 17 and multiplies them to obtain a second-order multiplication function.

Consequently, when the signal wave $f_m$ moves across any of the four quadrants, the product wave will be symmetrical, as shown in Figure 4(E) only at the instant that it is 90° or 270° from the locally-generated wave $f_0$.

Figure 7(A) illustrates the sign of the average product of the output of multiplier 16 when the $f_0$ vector is at 45° relative to a phase-reversal position. The dashed line 135°–315° transverse to $$f_0 \underline{/-45°}$$

is the zero average product line, since the $f_m$ vector is transverse to the $f_0$ vector along this line. In Figure 7(B), the sign of the average product is shown for the output of multiplier 17 for $$f_0 \underline{|135°}$$

Here, the null axis is 45°–225°, since it is transverse to 135°.

Thus, a positive average product in each of Figures 7(A) and (B) lies in a one-half plane on the same side of the dashed line as the $f_0$ vector; and the opposite one-half plane provides a negative product. Accordingly, at the instant that the $f_m$ vector is on the dashed line in either of two positions, the axis-crossings of the product are equally spaced and the average product is zero. The instantaneous products may be realized because when $f_m$ is in the positive half-plane, the positive loops of the product will be greater than its negative loops, and vice-versa in the opposite half-plane.

It is therefore noted that the product obtained by multiplier 16, as illustrated by Figure 7(A), obtains a zero average (symmetrical instantaneous product wave) only in the second and fourth quadrants. Its average is positive in the first quadrant and negative in the third quadrant. Since the modulation vector $f_m$ can be in any quadrant, it is very unlikely that it would at all times be in the second and fourth quadrants. Accordingly, an average value derived only from the output of multiplier 16 will not provide a signal that varies with the phase error of the local frequency.

An examination of Figure 6(B) illustrating the average product of multiplier 17 shows that it obtains a zero average (symmetrical instantaneous product wave) in the first and third quadrants, but not in the second and fourth. Thus, the use of multipler 17 alone would present the same difficulties as the use of multiplier 16 alone regarding its average product.

However, when used together, it is noted that they complement each other in that every information bit of the signal must go through a symmetrical product in one or the other of multipliers 16 and 17, due to the 90° separation of $f_0$ components received by the multipliers. Consequently, a second-order instantaneous multiplication by multiplier 21 of the instantaneous products obtained from multipliers 16 and 17 must provide a situation of equally-spaced zeros (axis crossings) whenever the $f_m$ vector is in any quadrant. As a result, the instantaneous second-order product will have a zero average along the bisector of any of the four quadrants; and its average over an integral number of cycles of $f_0$ changes from positive to negative or vice-versa when the $f_m$ vector passes through the bisector position, as long as the $f_0$ components are phased 90° apart at positions that are odd-integer multiples of 45°. Hence, the second-order multiplication provides a system independent of received data.

Figure 8(A) illustrates the sign and magnitude of the average product from multiplier 21 for the $f_m$ vector in any position in the various quadrants. The signs of the average polarity in Figure 8(A) can be obtained by multiplying the signs obtained by like vector $f_m$ positions in Figures 7(A) and (B). The magnitude variation of the average product is indicated by a four-leaf clover curve 36, and it goes to zero at the null axes.

It is therefore apparent from Figure 8(A) that there will be a null average condition for the second-order product when $f_m$ is along the bisector of each of the four quadrants, and that the system will operate independent of the data, since it makes no difference in which quadrant the data vector $f_m$ happens to be at a particular time.

As explained above, integrator 22 averages the second-order product over periods of two bit lengths each.

Figure 8(A) can be used to explain the averaging of the output of multiplier 21, in order to assist an understanding of the operation of the invention. An example is taken of a mark (M) bit followed by a space (S) bit in the second quadrant. In this case, the $f_m$ vector starts at 90° and swings to 180° to generate a mark bit, reverses at 180° and swings back to 90° to generate a space bit. Figures 9(A), (B) and (C) illustrate instantaneous product outputs of multiplier 21 taken over an $f_0$ cycle period when the $f_m$ vector is at positions 90°, 135° and 180°. In each of these figures, $P_1$ is the output of multiplier 16, $P_2$ is the output of multiplier 17, and $P_1 \times P_2$ is the output of multiplier 21. The 90° position for $f_m$ in Figure 8(A) means that it leads $f_0 \underline{|45°}$ by 45° in multiplier 16 and it lags $f_0 \underline{|135°}$ by 45° in multiplier 17

Hence, in Figure 9(A), product $P_1$ is derived from Figure 4(C) and $P_2$ is derived from Figure 4(A). It is apparent from Figure 9(A) that the average second-order product is substantially positive when $f_m$ is at 90°.

Figure 9(B) illustrates the second-order product when the $f_m$ vector is at the bisector of the second quadrant. Thus, Figure 9(B) includes $P_1$ derived from Figure 4(E), and $P_2$ is derived from Figure 4(B). It is thus apparent that the conditions of Figure 9(B) provide a zero average for $P_1 \times P_2$ over an integral number of cycles.

In a like manner, Figure 9(C) illustrates the situation for the $f_m$ vector at 180°. In Figure 9(C), product $P_1$ is obtained from Figure 4(G) and $P_2$ is obtained from Figure 4(C). Hence, the average of $P_1 \times P_2$ in Figure 9(C) is substantially negative over an $f_0$ cycle; and it is equal in magnitude but opposite in sign from $P_1 \times P_2$ in Figure 9(A).

Accordingly, it is noted that the average of the second-order product over the mark bit will be positive at the beginning of the $f_m$ vector swing, becomes zero at the center of the swing and becomes negative at the end of the swing. Furthermore, the over-all average taken over the entire swing of the mark bit will be zero as long as the $f_0$ components for multipliers 16 and 17 are displaced by 90° and are at odd-integer multiples of 45°. As seen from curve 36, the magnitude of the second-order product changes from zero at the null axes to a maximum midway between any of the null axes.

It is therefore noted that if the integration periods each have only a single bit length, it is necessary for the integration periods to be synchronized with the bit periods to obtain a zero net average for an $f_0$ phased at any odd-integer of 45°.

However, a choice of an integration period equal to two bit lengths eliminates the need for synchronization between the integration periods and received data bits. Furthermore, there must be a phase reversal between any data bits being multiplied and averaged over any two-bit integration period to provide a usable signal for phase control purposes. If there is no phase reversal, then a zero over-all average is obtained regardless of the error angle $$\underline{|e^\circ}$$

Figure 8B:
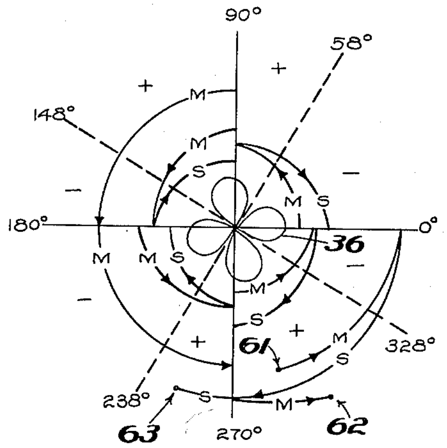

This can be seen from Figures 8(A) and 8(B). First consider a synchronized bit sequence M and S in Figure 8(A) being integrated when the phase of the locally-generated frequency is proper with respect to the received signal. It is obvious that the average is zero.

Next consider a synchronous M and S integration sequence in the second quadrant of Figure 8(B), where an error-angle of +13° is assumed for the phase-shifted locally-generated frequency. The error shifts the inputs to multipliers 16 and 17 by +13° making them 58° and 148°. The null axes for the second-order product are in all cases perpendicular to respective $f_0$ vectors applied to multipliers 16 and 17; and thus they will be at 148°—328° and 58°—238°. Hence, the synchronous sequence M and S in Figure 8(B) does not average out to zero, but has a net average that is positive with respect to the 148° axis over a double bit length integration period. That is, both M and S move through a longer positive zone between 90° and 148° than they do a negative zone between 148° and 180°.

Finally consider a non-bit-synchronous integration in Figure 8(B) for a double integration period. Consider an M and S sequence in the third quadrant with an integration period beginning at point 61 after the M bit has begun. That is, the mark bit started at 270° and progressed to the angle of point 61 before the integration began. Consequently, the integration continues through a phase reversal at angle 0°, where a space bit begins, and continues through the space bit into the first part of following bit which may be either a mark or space. If it is a mark, the phase will reverse at 270°; and the integration will terminate at point 62, which has the same angular position as point 61. On the other hand, if the last bit was a space, the modulation will continue in a clockwise direction from 270° to a point 63, at which the integration terminates. It will be noted whether the last bit portion was M or S, it will be in a positive zone and will make up for the loss in positive zone caused by the late start of integration at point 61. Accordingly, the net magnitude of the two-bit integration without bit synchronization will be the same as a two-bit integration having bit synchronization.

When there is no phase transition between the integrated bits, no error signal is obtainable. This can be seen from Figure 8(B) by considering the data sequence M and M. It is noted there that the double bit length occupies equal total positive and negative areas, and thus will provide a net integration of zero, regardless of the phase error shift of the null axes.

As a result of using an integration period of two bit lengths, it is seen that a constant frequency providing continuous marks or continuous spaces will not provide any phase synchronization signal. However, whenever pulse code or teletypewriter information is sent with start-stop bits and an odd number of bits per character, a bit transition during at least one double-bit integration is assured for every two characters.

It will be noted that an M and S sequence in the first or third quadrants of Figure 8(B) will integrate to yield a net negative quantity, while they will integrate to a positive quantity in the second or fourth quadrants. Hence, the net polarity is a function of received data and cannot be used.

Accordingly, only the magnitude of the net average is used to determine local phase error. Polarity variations are discarded by full-wave detector 28, which is placed after sampling gate 23, but could as well have been placed between it and the integrator output. Consequently, the null condition (zero magnitude) is used in Figure 1 to determine the proper phase condition for the local frequency.

A null-seeking servo 30, which may be conventional, is connected to the output of smoothing filter 29. Accordingly, servo 30 adjusts phase shifter 12 until its output phase obtains a null at the input to servo 30, at which time a proper phase lock at $$f_0 \underline{|45^\circ}$$

is obtained. However, the phase lock could also be at $$f_0 \underline{|135^\circ}$$

$$f_0 \underline{|225^\circ}$$

or $$f_0 \underline{|315^\circ}$$

(any odd-integer multiple of 45°) using the principles described above.

Thus, a fixed phase-shifter 15, connected between the output of shifter 12 and an output terminal 36, provides a $$\underline{|-45^\circ}$$

phase shift to obtain an output $$f_0 \underline{|0^\circ}$$

It is realized that the output could also be locked on 90°, 180° or 270° (any integer multiple of 90°) with any of these being usable for detection in a minimum-shift receiver.

Figure 2:
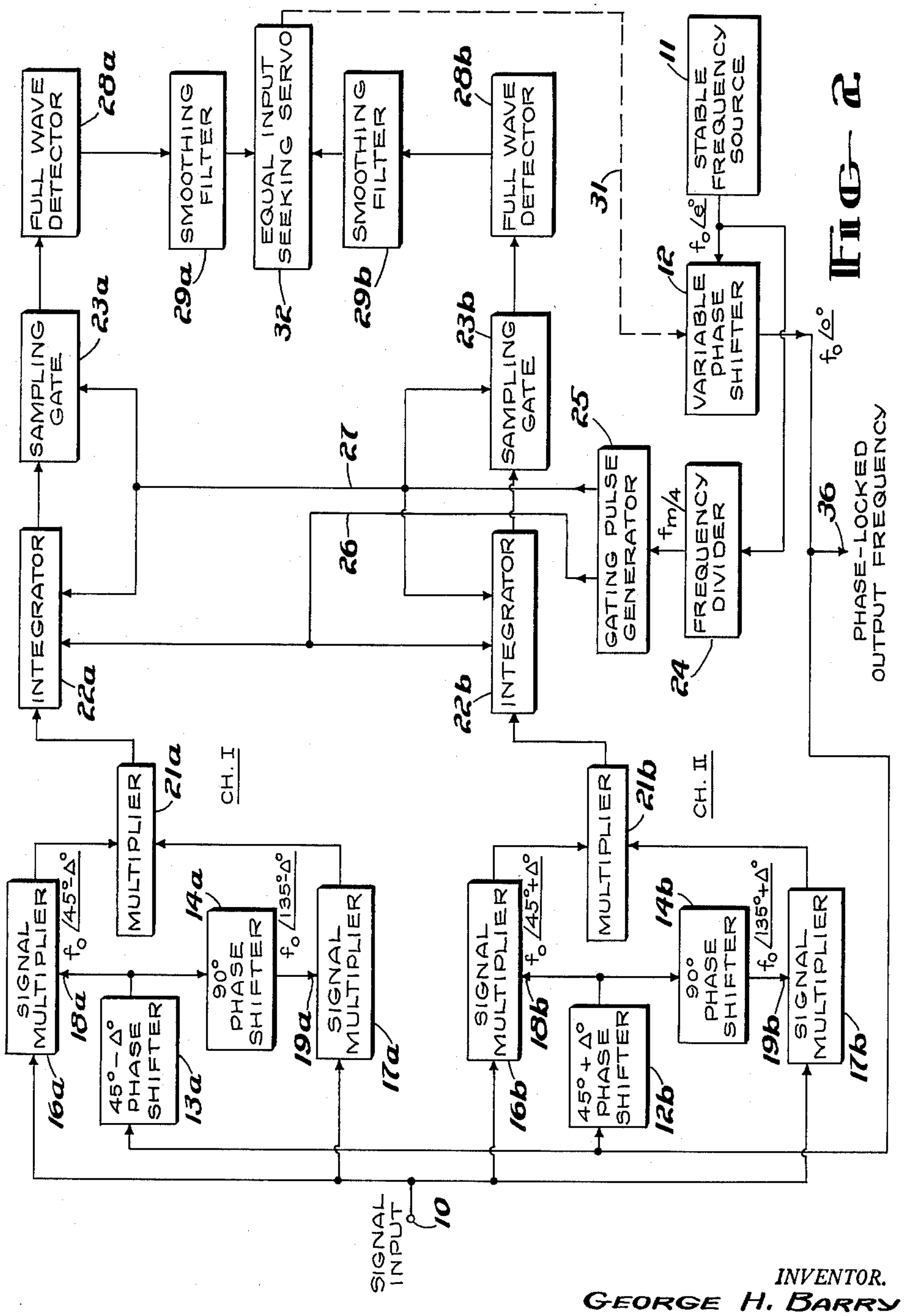
Figure 2 shows a preferred form of the invention.

Due to the awkwardness of magnitude null-seeking servos having no directional sense to indicate which side of the null an error happens to be, and also due to the fact that inherent noise interferes with the sensitivity of a null, the more complicated system of Figure 2 is preferred.

In the arrangement of Figure 2, two systems (called channels I and II) are used, with each being like those of Figure 1. They are combined in a manner that obtains an error directional sense for a servo system. Also, the system of Figure 2 does not use the null condition, but obtains significant signal when a phase-lock is obtained and thus is more immune to noise. The two channels are arranged so that variation in a given direction from a phase-lock condition will increase the output magnitude of one and decrease the output magnitude of the other, with reverse magnitude changes for the opposite direction of phase drift from the locked position.

Since the arrangement of Figure 2 involves two channels, each being a system similar to that in Figure 1, like items in the two channels which are the same as those found in Figure 1, carry like reference numbers, except that an appropriate letter *a* or *b* is added to designate whether it is in channel I or II.

A further sophistication of each channel in Figure 2 over the system of Figure 1 is that a known phase error Δ° is provided at the inputs to multipliers 16 and 17. It is subtracted from the $f_0$ inputs in channel I, and is added to the $f_0$ inputs in channel II.

A pair of fixed phase-shift circuits 13a and 13b obtain equal and opposite known error shifts $\Delta°$ at the input of each channel. Phase shifter 13a provides a phase shift of $45°-\Delta°$, and phase shifter 13b provides $45°+\Delta°$. Hence multipliers 16a and 17a in channel I receive locally-generated inputs $$f_0\underline{|45°-\Delta°}$$

and $$f_0\underline{|135°-\Delta°}$$

Likewise, signal multipliers 16b and 17b, in channel II receive inputs $$f_0\underline{|45°+\Delta°}$$

and $$f_0\underline{|135°+\Delta°}$$

Phase shifters 13a and *b* could as well have left out the 45° terms and have provided merely $-\Delta°$ and $+\Delta°$ phase shifts respectively; but this would have caused the output of variable phase shifter 12 in Figure 2 to provide a phase of $$f_0\underline{|45°}$$

thus requiring the addition of another 45° phase shifter like shifter 15 in Figure 1 to provide a zero output phase. Hence, by using phase shifts with the 45° terms, an additional phase shifter is eliminated.

Figure 10A:
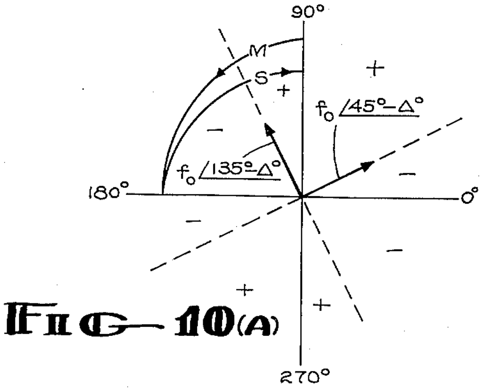
Figure 10B:
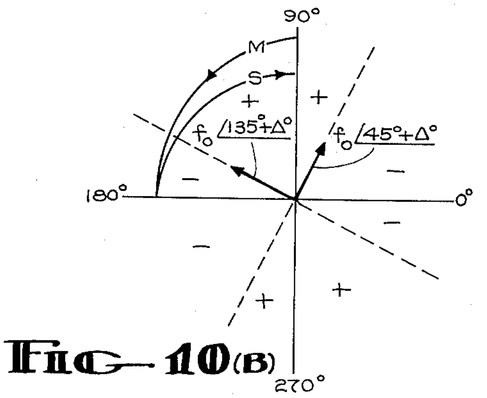

The second-order product operations of multipliers 21a and *b* are represented by Figures 10(A) and 10(B). Hence, it is noted in Figure 10(A) that the null axes are shifted $\Delta°$ clockwise; while the null axes in Figure 10(B) are shifted $\Delta°$ counter-clockwise.

Accordingly, whenever a phase-locked condition is obtained, it can be seen that both channels provide equal average outputs having a magnitude dependent upon a choice of $\Delta°$.

If the local phase should change relative to the data reversals or vice-versa, the null axes in both Figures 10(A) and (B) will rotate in the same direction by an amount corresponding to the phase error. Consider the situation where $f_0$ shifts by a small positive error, which rotates the axes in both Figures 10(A) and (B) counter-clockwise by an amount less than $\Delta°$. In such case, the magnitude of the integrated signal from channel I decreases because its axes shift nearer to the null condition of Figure 8(A); while the magnitude of the integrated signal from channel II increases because its axes shift farther from the null condition of Figure 8(A).

On the other hand, consider the situation where $f_0$ shifts by a negative error, which rotates the axes in Figures 10(A) and (B) clockwise by an amount less than $\Delta°$. In such case, the magnitude of the integrated signal from channel I increases because the axes shift further from the null conditions; while the magnitude of the integrated signal from channel II decreases, because its axes shift nearer to the null condition.

Accordingly, a servo 32 is provided in Figure 2 which receives the smoothed outputs of both channels I and II. Servo output shaft 31 adjusts variable phase shifter 12 until the outputs of both channels are equal. Thus, when the input from the filter 29a is smaller than the input from filter 29b, servo shaft 31 is rotated in a direction that decreases the phase angle of the frequency from variable phase shifter 12. And when the output of filter 29a is greater than the output of filter 29b, servo shaft 31 rotates in an opposite direction to increase the phase angle of the output of variable phase shifter 12, until the filter outputs are equal which provides a corrected phase angle.

In some instances, servos may include pulse amplitude comparators in which case the smoothing filters 29a and *b* may be eliminated.

There will be four phase conditions at integer multiples of 90° where phase lock may occur in the system of Figure 2 and any of them can be used for signal detection in a minimum shift receiver.

It can be shown that the magnitude of the integrator samplings is approximately $$\frac{2}{\omega_m}\sin(2e°)$$

where a phase reversal occurs in a two-bit integration period and where $f_0$ is much greater than $f_m$. Furthermore, low-pass filtering is permissible at the output of the first-order multipliers 16 and 17 as long as a time-constant much less than $f_m$ is used.

The principles of the invention have been described and illustrated in operative systems for the purpose of teaching those skilled in the art how the invention may be performed. Changes in the components, units and assemblies will appeal to those skilled in the art, and it is contemplated that such changes may be employed, but yet fall within the spirit and scope of the claims that are to follow.

I claim:

1. An automatic phase control circuit for use with minimum shift modulation comprising, a phase stable frequency source, a variable phase shifter connected to the output of said source and providing an output with a controlled phase shift, means for separating the output of said variable phase shifter into two components separated by 90°, a pair of signal multipliers respectively receiving said component as inputs, said multipliers also having inputs connected to said modulation, a third multiplier receiving outputs of said pair of multipliers, a gated integrator connected to the output of said third multiplier, means for gating said integrator for periods equal to two integral numbers of bit periods of said modulation, and means for adjusting said phase shifter to a phase that provides zero magnitude for integrations by said integrator.

2. An automatic phase control circuit for minimum shift modulation of digital bits, comprising a stable frequency source, a pair of signal multipliers, each receiving said modulation as an input, a variable phase shifter connected to said source, means connected between an output of said variable phase shifter and other respective inputs of said pair of multipliers, said last mentioned means providing a fixed phase difference between its multiplier inputs, a third multiplier receiving the product outputs of said pair of multipliers, gated integration means connected to said third multiplier to average its output over periods equal to an integral multiple of the length of said bits, means for rectifying, sampling and smoothing the terminal parts of integrations of said integration means, and means for indicating the magnitude of an output of said rectifying, sampling and smoothing means.

3. An automatic phase control circuit for minimum shift modulation of digital bits, comprising a stable frequency source, a pair of signal multipliers, each receiving said modulation as an input, a variable phase shifter connected to said source, means connected between an output of said variable phase shifter and other respective inputs of said pair of multipliers, said last mentioned means providing a fixed phase difference between its multiplier inputs, a third multiplier receiving the product outputs of said pair of multipliers, gated integration means connected to said third multiplier to average its output over periods equal to an integral multiple of the length of said bits, means for rectifying, sampling and smoothing the terminal parts of integrations of said integration means, null seeking servo connected between an output of said rectifying, sampling and smoothing means and said variable phase shifter.

4. An automatic phase control circuit for minimum shift modulation of digital bits, comprising a stable frequency source, a variable phase shifter connected to the output of said source, a pair of multipliers each having an input connected to receive said modulation, phase splitter means connected between the output of said variable phase shifter and another pair of inputs of said pair of multipliers, said phase splitter providing a fixed phase difference between the second inputs of said pair of multipliers, a third multiplier having inputs connected to said outputs of said pair of multipliers to provide a second order product, integration means connected to the output of said third multiplier, means for gating said integration means to receive the output of said multiplier for periods equal to twice the length of said bits, means for rectifying and sampling the output of said integrator at the end of each of its integrations, a smoothing filter connected to the output of said rectifying and sampling means, and servo means connected between the output of said filtering means and said variable phase shifter, the output of said phase shifter being phase locked with respect to said received signal.

5. A phase lock system, as defined in claim 4 in which said phase splitter comprises a 90° phase shifter, an input of said 90° phase shifter being connected to the input of one of said pair of multipliers, and an output of said phase shifter connected to an input of said other of said pair of multipliers.

6. A phase lock system, as defined in claim 4, having a frequency divider receiving the frequency of said source, with said divider providing an output rate of ½ the rate of said bits, a gating pulse generator connected to said divider output, one output of said square wave generator being a square form of the generator input and being connected to said integrator to gate its input, a second output of said generator being a pulse following the gating wave of said other input, said second generator output being connected to said integrator and to said rectifying and sampling means to sample said integrator and quench it.

7. An automatic phase control circuit for minimum shift modulation of digital bits, comprising a stable frequency source, and a variable phase shifter connected to said source, a pair of phase shifters having inputs connected to said source, said pair providing opposite types of phase shifts, a pair of channels; each channel comprising a pair of multipliers having inputs receiving said modulation, a phase splitter providing a second input to each of said pair of multipliers with a fixed phase difference, a third multiplier connected to the outputs of said pair of multipliers to provide a second order product; integration means connected to the output of said third multiplier for integrating over periods equal to two bit periods of said modulation, rectifier and sampling gate means connected to the output of said integrator to sample its magnitude at the end of each integration; the outputs of said pair of phase shifters being respectively connected to inputs of said phase splitters, equal input seeking servo means having a pair of inputs, means connecting the outputs of said channels to the respective inputs of said servo means, and an output of said servo means being connected to said variable phase shifter to control it.

8. A phase lock system, as defined in claim 7, in which said pair of phase shifters each provide a phase shift having a non term Δ°, with said non term being opposite in sign for said respective pair of phase shifters.

9. A phase lock system, as defined in claim 7, in which said pair of phase shifters provide respective phase shifts of (45°−Δ°) and (45°+Δ°), and said phase splitters each provide a 90° fixed phase shift.

10. In apparatus according to claim 7 a pair of smoothing filters connected between the inputs to the equal input seeking servo means and the outputs of said channels.

11. A phase lock system, as defined in claim 7 comprising gating means including a frequency divider including a frequency divider connected to said source and having a division rate equal to half the bit rate of said modulation, a pulse generator connected to said frequency divider and providing output pulses of twice the length of modulation bits, said output pulses being connected to the integrator means of each channel, said generator also providing quench and sampling pulses following said integrator pulses, said second output being connected to said integrators and said rectifying and sampling gate means in each of said channels.

References Cited in the file of this patent

UNITED STATES PATENTS

| | | |
|---|---|---|
| 2,492,795 | Goldstine | Dec. 27, 1949 |
| 2,836,712 | Crosby | May 27, 1958 |
| 2,855,506 | Schabauer | Oct. 7, 1958 |